United States Patent
Jiang et al.

(10) Patent No.: US 12,353,661 B1
(45) Date of Patent: Jul. 8, 2025

(54) TOUCH DISPLAY CIRCUIT AND TOUCH DISPLAY DEVICE

(71) Applicant: AUO Corporation, Hsinchu (TW)

(72) Inventors: Tian-Jing Jiang, Hsinchu (TW); Yueh-Chi Wu, Hsinchu (TW); Hung-Chia Liao, Hsinchu (TW); Ti-Kuei Yu, Hsinchu (TW); Ya-Ling Hsu, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/822,435

(22) Filed: Sep. 2, 2024

(30) Foreign Application Priority Data

Mar. 7, 2024 (TW) .................................. 113108301

(51) Int. Cl.
  *G06F 3/041* (2006.01)
(52) U.S. Cl.
  CPC ................................. *G06F 3/04166* (2019.05)
(58) Field of Classification Search
  None
  See application file for complete search history.

(56) References Cited

U.S. PATENT DOCUMENTS

| | | | | |
|---|---|---|---|---|
| 2008/0251299 | A1* | 10/2008 | Liao | H03K 17/962 178/18.06 |
| 2010/0177058 | A1* | 7/2010 | Lin | H03K 17/955 345/174 |
| 2023/0030770 | A1* | 2/2023 | Lin | G06F 3/04164 |

FOREIGN PATENT DOCUMENTS

| | | |
|---|---|---|
| CN | 108762551 | 11/2018 |
| CN | 110010021 | 7/2019 |

* cited by examiner

*Primary Examiner* — Krishna P Neupane
(74) *Attorney, Agent, or Firm* — JCIPRNET

(57) ABSTRACT

Disclosed are a touch display circuit and a touch display device. The touch display circuit includes a touch circuit and a light-emitting element set. The touch circuit includes a first touch electrode and corresponding plurality of second touch electrodes. The first touch electrode receives an emitting signal. The plurality of second touch electrodes respectively generate a plurality of sensing signals. A first end of the light-emitting element set is directly coupled to the first touch electrode and receives the emitting signal as a first driving signal. A second end of the light-emitting element set receives a second driving signal. As such, the touch display circuit is able to drive the touch circuit and the light-emitting element set simultaneously to simplify the circuit design.

9 Claims, 7 Drawing Sheets

TOUCH DISPLAY CIRCUIT AND TOUCH DISPLAY DEVICE

CROSS-REFERENCE TO RELATED APPLICATION

This application claims the priority benefit of Taiwan application serial no. 113108301, filed on Mar. 7, 2024. The entirety of the above-mentioned patent application is hereby incorporated by reference herein and made a part of this specification.

BACKGROUND

Technical Field

The present disclosure relates to a display circuit, and in particular, to a touch display circuit and a touch display device.

Description of Related Art

Generally speaking, current touch displays may be designed to be thin and light displays with touch functions through various manufacturing processes. The manufacturing process may include one glass metal mesh (OGM) touch control architecture and one glass solution (OGS) touch control architecture. The touch display may also expand the touch display area by splicing multiple display panels. The touch display may be provided with light-emitting circuits (such as multiple light-emitting diodes) at the spliced parts to achieve a seamless splicing effect.

However, in a touch display with an OGM architecture, since the touch circuit and the light-emitting circuit are respectively disposed on different metal layers, additional independent wiring is required between the touch circuit and the light-emitting circuit to enable the circuits to achieve the coplanar effect, and therefore the complexity of circuit design is increased.

On the other hand, in a touch display with an OGS architecture, the touch circuit and the light-emitting circuit are disposed on the same metal layer, and are bridged together through wirings on the metal layer. However, due to the lack of independent wiring of the light-emitting circuit, the touch display is not able to independently control the driving signals of the light-emitting circuit, and therefore the complexity of circuit design is increased.

SUMMARY

Embodiments of the present disclosure provide a touch display circuit that may be applied in OGM and OGS architectures, and may drive the touch circuit and the light-emitting circuit simultaneously to simplify circuit design.

In an embodiment of the disclosure, a touch display circuit includes a touch circuit and a light-emitting element set. The touch circuit includes a first touch electrode and corresponding plurality of second touch electrodes. The first touch electrode receives an emitting signal. The plurality of second touch electrodes respectively generate a plurality of sensing signals. A first end of the light-emitting element set is directly coupled to the first touch electrode and receives the emitting signal as a first driving signal. A second end of the light-emitting element set receives a second driving signal.

An embodiment of the present disclosure further provides a touch display device. The touch display device includes a display panel and the touch display circuit of the above embodiment. The display panel has a pixel array. The touch display circuit is coupled to the pixel array.

Based on the above, the touch display circuit and the touch display device in the embodiment of the present disclosure are directly coupled to the first light-emitting element set through the first touch electrode, so that the emitting signal may serve as the driving signal of the first light-emitting element set. In this way, the touch display circuit may drive the touch circuit and the first light-emitting element set simultaneously, thereby simplifying the circuit design to be applied in OGM and OGS architectures.

In order to make the above-mentioned features and advantages of the present disclosure more obvious and easy to understand, embodiments are given below and described in detail with reference to the attached drawings.

DESCRIPTION OF THE EMBODIMENTS

Some embodiments of the present disclosure will be described in detail with reference to the accompanying drawings. The reference symbols cited in the following description will be regarded as the same or similar components when the same reference symbols appear in different drawings. These embodiments are only part of the present disclosure and do not disclose all possible implementations of the present disclosure. Rather, these embodiments are only examples of claims of the present disclosure.

Figure 1:
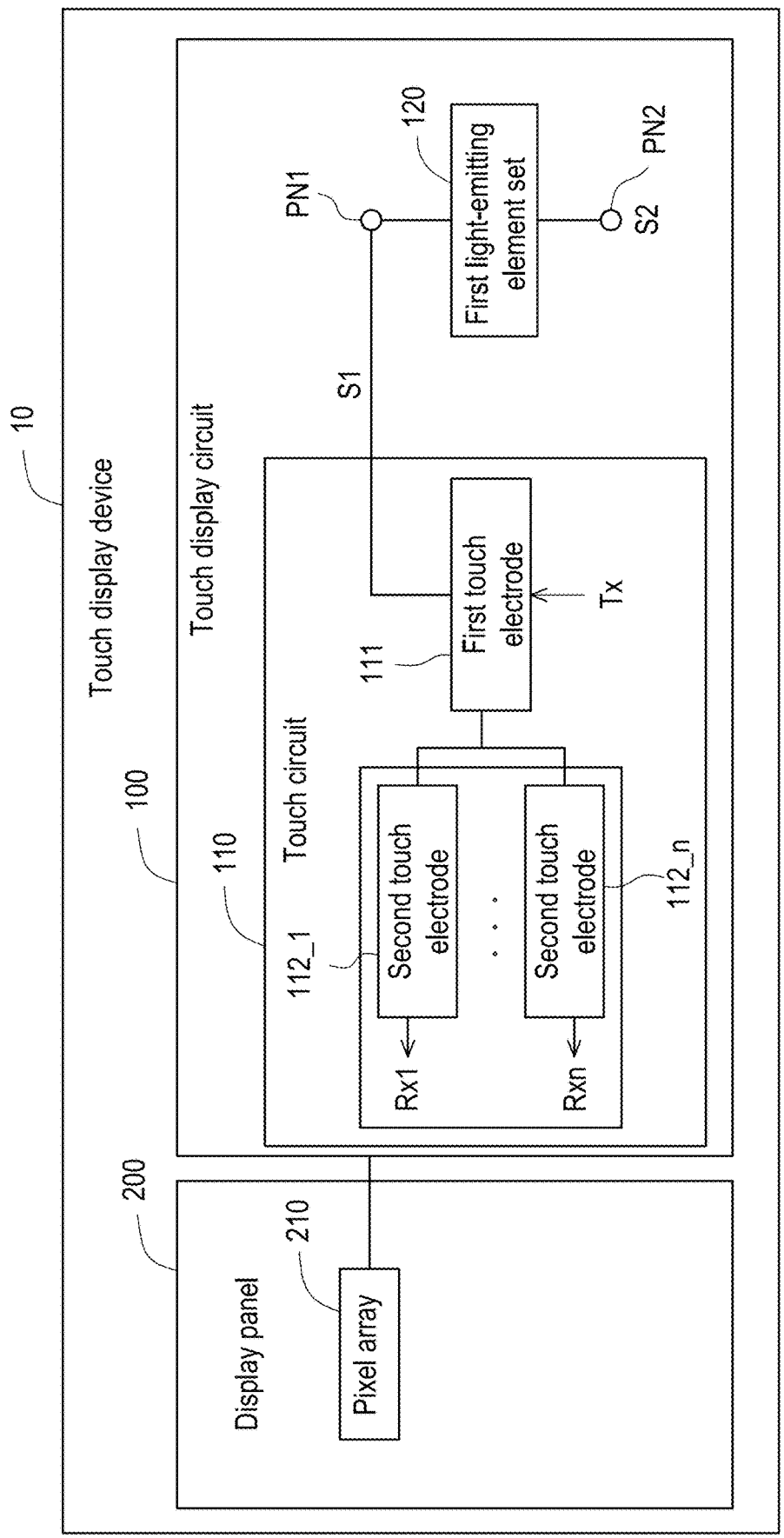
FIG. 1 is a block diagram of a touch display device according to an embodiment of the present disclosure.

FIG. 1 is a block diagram of a touch display device according to an embodiment of the present disclosure. Referring to FIG. 1, the touch display device 10 may be made thin and light through the OGM or OGS process. The touch display device 10 may include a touch display circuit 100 and a display panel 200. The display panel 200 has a pixel array 210. The pixel array 210 is coupled to the touch display circuit 100. The pixel array 210 and the touch display circuit 100 overlap each other on the same substrate (not shown).

In this embodiment, the display panel 200 may be, for example, a liquid crystal display (LCD), a light-emitting diode (LED), or an organic light-emitting diode (OLED), or micro light-emitting diode (micro LED) and other display panels that provide display functions.

In this embodiment, the touch display circuit 100 may include a touch circuit 110 and a first light-emitting element set 120. The touch circuit 110 may include a first touch electrode 111 and a corresponding plurality of second touch electrodes 112_1 to 112_n, wherein n is a positive integer greater than 1. The first touch electrode 111 is coupled to the corresponding plurality of second touch electrodes 112_1 to 112_n. The first touch electrode 111 receives and transmits the emitting signal Tx. The plurality of second touch electrodes 112_1 to 112n respectively generate a plurality of sensing signals Rx1 to Rxn.

In this embodiment, the first touch electrode 111 may be, for example, a transmitting electrode. The second touch electrodes 112_1 to 112_n may respectively be a plurality of receiving electrodes, for example. The first touch electrode 111 and the plurality of second touch electrodes 112_1 to 112_n may respectively be, for example, indium tin oxide (ITO) electrodes or other transparent conductive materials.

In this embodiment, the first end PN1 of the first light-emitting element set 120 is directly coupled to one end of the first touch electrode 111. The first end PN1 of the first light-emitting element set 120 receives the emitting signal Tx from the first touch electrode 111 as the first driving signal S1 for driving the first light-emitting element set 120. The second end PN2 of the first light-emitting element set 120 receives at least one second driving signal S2. That is to say, the first light-emitting element set 120 is controlled by the first driving signal S1 and the second driving signal S2 to emit light.

In this embodiment, the first light-emitting element set 120 may include, for example, a light-emitting diode (LED), an organic light-emitting diode (OLED), a micro-LED, and other display circuits that provide display functions.

It is worth mentioning that since the first light-emitting element set 120 is connected to the first touch electrode 111 through the first end PN1, the first light-emitting element set 120 and the touch circuit 110 may use the same wiring to achieve the coplanar effect, and they may be set on different or the same metal layer, so such configuration may be applied in OGM, OGS or OTP (On-Cell Touch Panel) architecture. In addition, by operating the touch circuit 110 and the first light-emitting element set 120 through a common emitting signal Tx (i.e., the first driving signal S1), the touch display circuit 100 may simultaneously drive the touch circuit 110 and the first light-emitting element set 120, thereby simplifying circuit design.

Figure 2A:
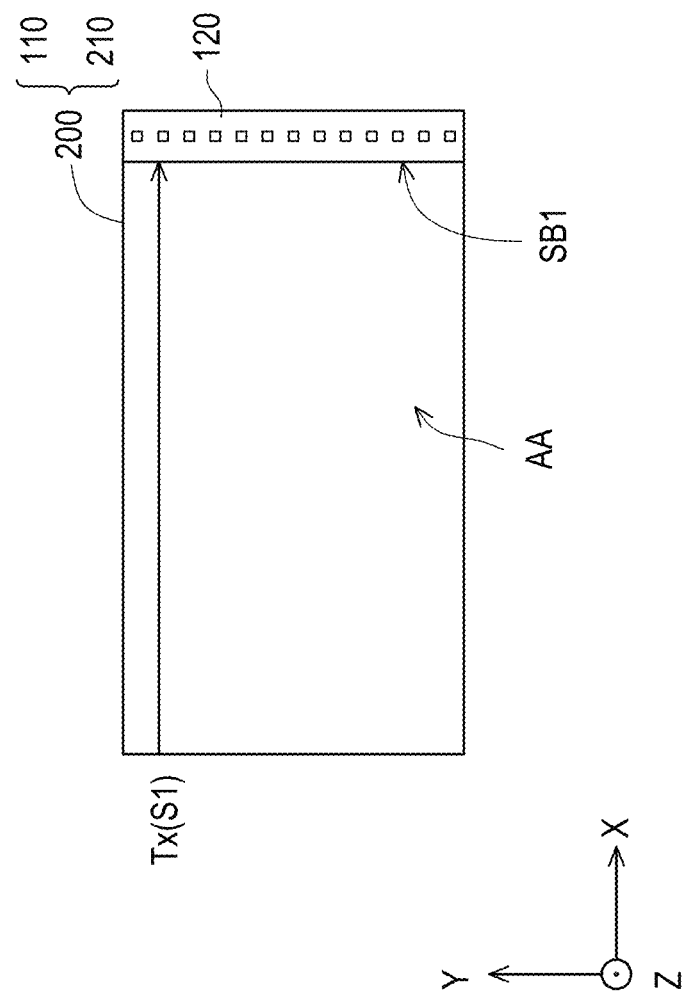
FIG. 2A is a schematic diagram of an application of the touch display device according to the embodiment of FIG. 1 of the present disclosure.

FIG. 2A is a schematic diagram of an application of the touch display device according to the embodiment of FIG. 1 of the present disclosure. Referring to FIG. 1 and FIG. 2A, the pixel array 210 and the touch circuit 110 may be disposed in the active area AA of the display panel 200, for example. The first light-emitting element set 120 may, for example, be disposed on one or more lateral sides (for example, the first lateral side SB1) of the display panel 200. The first light-emitting element set 120 may, for example, extend in the Y direction.

In this embodiment, in the active area AA, the first touch electrode 111 may, for example, transmit the emitting signal Tx to the first light-emitting element set 120 in the X direction, so that the first light-emitting element set 120 uses the emitting signal Tx as the first driving signal S1.

Figure 2B:
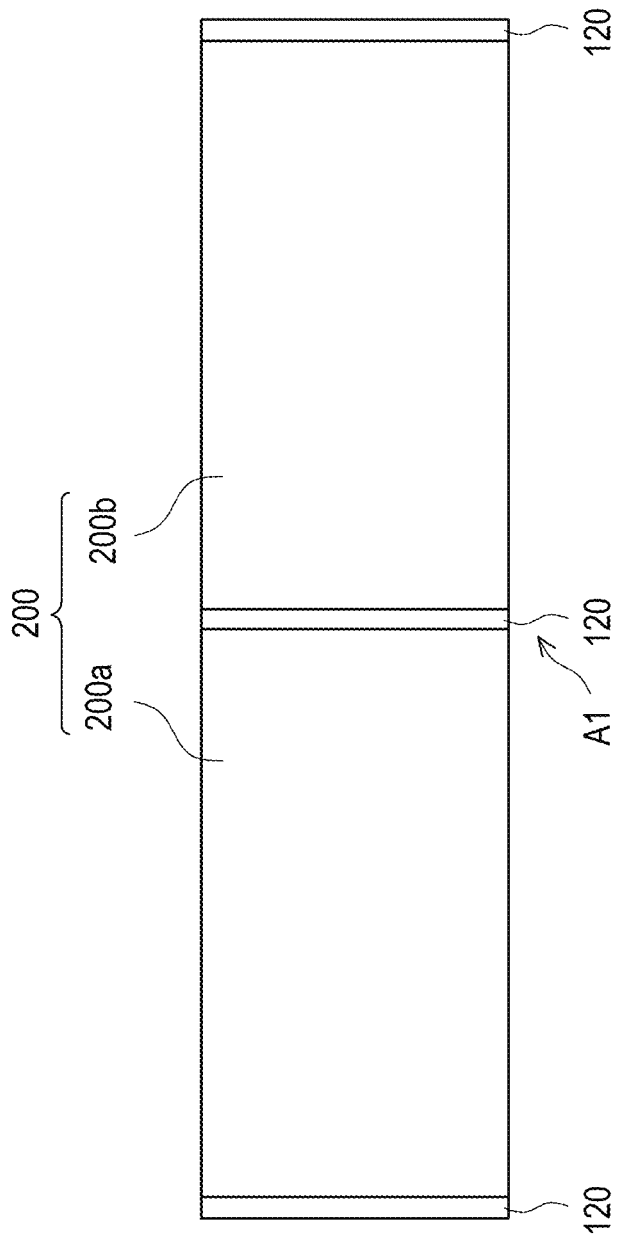
FIG. 2B is a schematic diagram of an application of the touch display device according to the embodiment of FIG. 1 of the present disclosure.

FIG. 2B is a schematic diagram of an application of the touch display device according to the embodiment of FIG. 1 of the present disclosure. Referring to FIG. 1 and FIG. 2B, the display panel 200 may include a plurality of sub-display panels 200a to 200b that are spliced to each other. The number of the sub-display panels 200a to 200b is only an example. Each of the sub-display panels 200a to 200b may be, for example, the display panel 200 shown in FIG. 1 or 2A.

In this embodiment, the first light-emitting element set 120 may, for example, be disposed between the plurality of sub-display panels 200a to 200b (i.e., the splicing area A1). In this way, the touch display device 10 may achieve a seamless splicing effect through the first light-emitting element set 120.

In some applications, as shown in FIG. 2B, the touch display device 10 may further include a plurality of first light-emitting element sets 120. The plurality of first light-emitting element sets 120 may be respectively disposed on the lateral side of the sub-display panel 200a, the lateral side of the sub-display panel 200b, and the splicing area A1 between the plurality of sub-display panels 200a to 200b.

Figure 3:
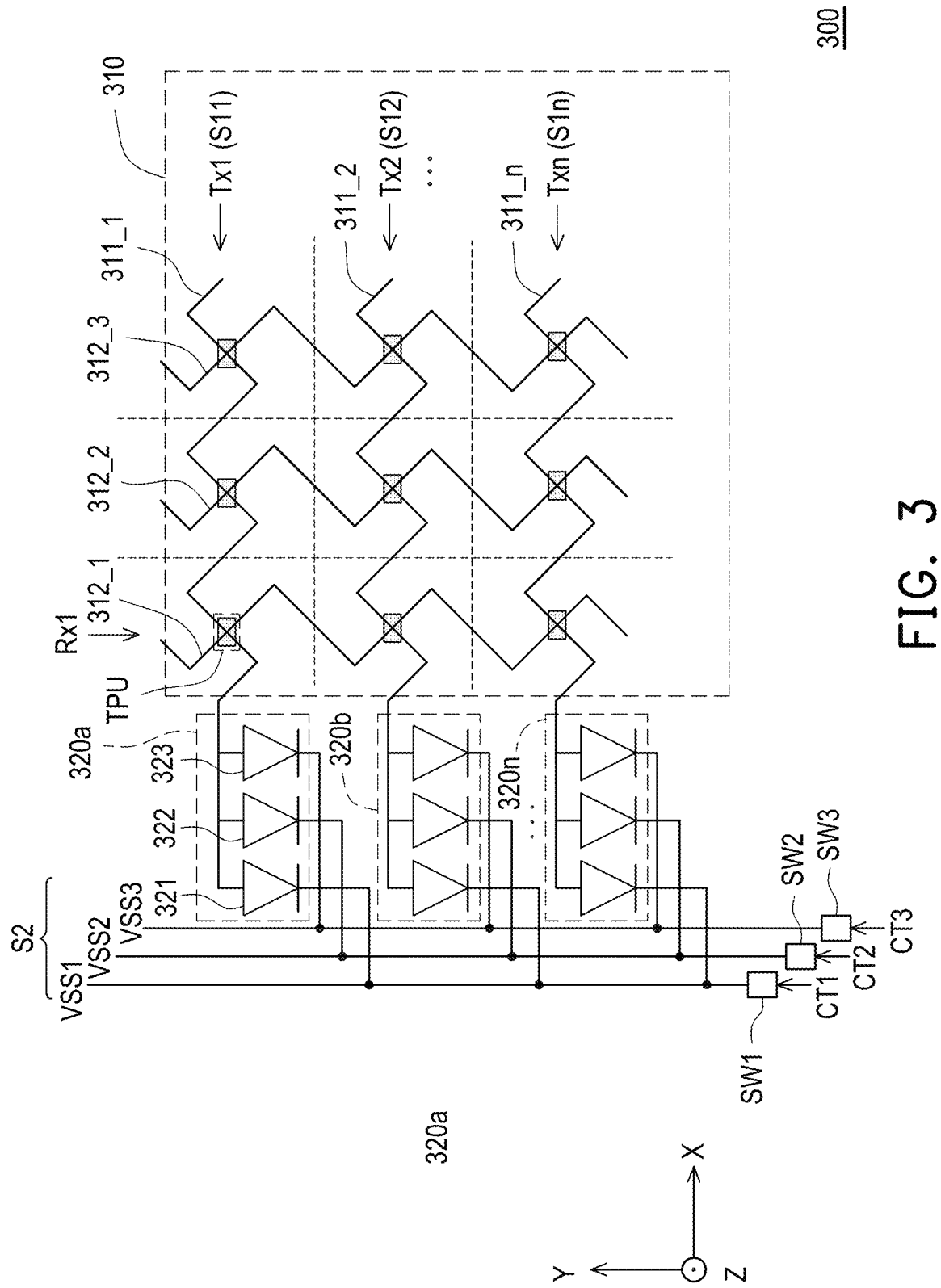
FIG. 3 is a circuit diagram of a touch display circuit according to an embodiment of the present disclosure.

FIG. 3 is a circuit diagram of a touch display circuit according to an embodiment of the present disclosure. Referring to FIG. 3, the touch display circuit 300 may include a touch circuit 310 and a plurality of first light-emitting element sets 320a to 320n, wherein n is a positive integer greater than 2. The touch circuit 310 may include a plurality of first touch electrodes 311_1 to 311_n and a plurality of second touch electrodes 312_1 to 312_3. The respective numbers of the plurality of first light-emitting element sets 320a to 320n and the plurality of touch electrodes 311_1 to 311_n and 312_1 to 312_3 are only examples. For description of the touch circuit 310 and each of the first light-emitting element sets 320a to 320n, please refer to the relevant description of the touch display circuit 100 by analogy.

In this embodiment, the first touch electrode 311_1 extends in the X direction and is directly coupled to the corresponding first light-emitting element set 320a. The plurality of second touch electrodes 312_1 to 312_3 respectively extend in the Y direction. In the Z direction, the projections of the first touch electrode 311_1 and the plurality of second touch electrodes 312_1 to 312_3 on the substrate where the touch display circuit 300 is disposed are staggered with each other to form a plurality of touch units. For example, the first touch electrode 311_1 and the corresponding second touch electrode 312_1 form a touch unit TPU. For description of other first touch electrodes 311_2 to 311_n, please refer to the relevant description of the first touch electrode 311_1 by analogy.

In the embodiment of FIG. 3, the first light-emitting element set 320a may include a plurality of light-emitting diodes 321 to 323. The plurality of light-emitting diodes 321 to 323 are configured to emit light of different wavelengths. Specifically, the light-emitting diode 321 may be, for example, a red LED. The light-emitting diode 322 may be, for example, a green LED. The light-emitting diode 323 may be, for example, a blue LED.

Further to the above description, a plurality of first ends (for example, multiple anode ends) of the plurality of light-emitting diodes 321 to 323 are directly coupled to the corresponding first touch electrode 311_1, and receive the common emitting signal Tx1 (i.e., first driving signal S11). The plurality of second ends (for example, a plurality of cathode ends) of the plurality of light-emitting diodes 321 to 323 receive a plurality of first sub-driving signals VSS1 to VSS3 respectively. For description of other first light-emitting element sets 320b to 320n, please refer to the relevant description of the first light-emitting element set 320a by analogy. It should be noted that the plurality of second ends (i.e., cathode ends) of different first light-emitting element sets 320*a* to 320*n* respectively receive a plurality of common first sub-driving signals VSS1 to VSS3.

In this embodiment, the plurality of first sub-driving signals VSS1 to VSS3 may be included in the second driving signal S2 as another implementation of the second driving signal S2 in FIG. 1. The plurality of first sub-driving signals VSS1 to VSS3 may respectively be, for example, ground signals, or voltage signals with lower voltage values.

In the embodiment of FIG. 3, the touch display circuit 300 may also include a plurality of switches SW1 to SW3. The plurality of switches SW1 to SW3 are respectively coupled between the plurality of second ends (i.e., cathode ends) of the plurality of light-emitting diodes 321 to 323 and the plurality of first sub-driving signals VSS1 to VSS3. The plurality of switches SW1 to SW3 are respectively controlled by a plurality of control signals CT1 to CT3. The plurality of control signals CT1 to CT3 may, for example, come from a timing controller (not shown) of the touch display circuit 300.

That is to say, the switch SW1 performs a switching operation according to the control signal CT1 to turn on or cut off the path between the first sub-driving signal VSS1 and the second end (i.e., the cathode end) of the light-emitting diode 321. In this way, the switch SW1 controls the second end (i.e., the cathode end) of the light-emitting diode 321 to receive the first sub-driving signal VSS1 (e.g., the ground signal) or to be in a floating state according to the control signal CT1. For description of other switches SW2 to SW3, please refer to the relevant description of switch SW1 by analogy.

Figure 4:
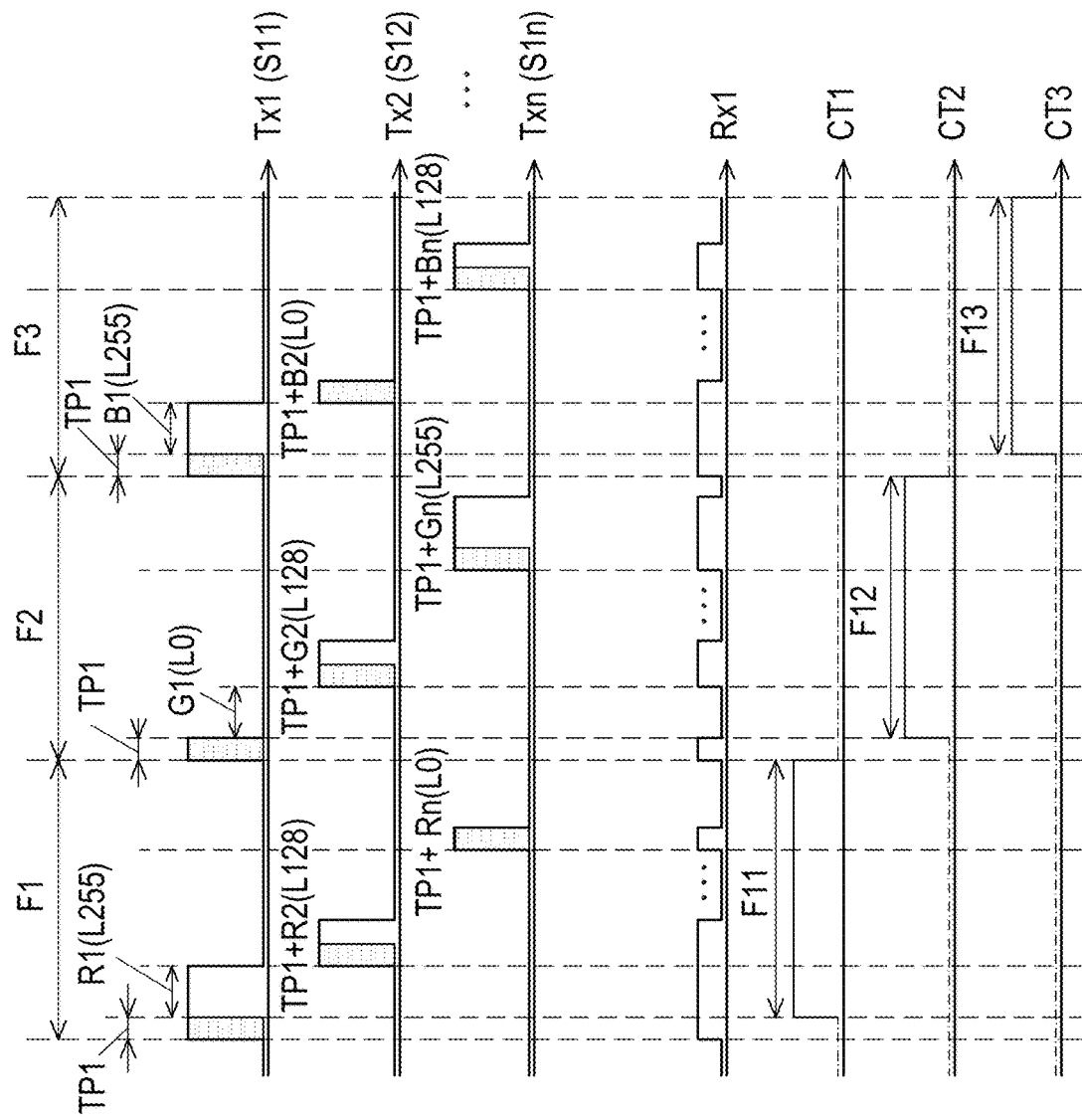
FIG. 4 is a schematic diagram of an operation of the touch display circuit according to the embodiment of FIG. 3 of the present disclosure.

Referring also to FIG. 4, FIG. 4 is a schematic diagram of an operation of the touch display circuit according to the embodiment of FIG. 3 of the present disclosure. In FIG. 4, the horizontal axis represents the operation time of the touch display circuit 300 and the vertical axis represents the voltage value.

In the embodiment of FIG. 4, the brightness of the plurality of first light-emitting element sets 320*a* to 320*n* is respectively controlled by the enabled period of the plurality of emitting signals Tx1 to Txn (i.e., the first driving signals S11 to S1*n*). Specifically, the touch display circuit 300 may be operated in a plurality of consecutive frame periods F1 to F3. The plurality of frame periods F1 to F3 may respectively correspond to a plurality of light-emitting periods of the red LED, the green LED, and the blue LED. In some embodiments, the plurality of frame periods F1 to F3 may be operated as a single frame period to include a plurality of light-emitting periods of different wavelengths.

In this embodiment, each of the control signals CT1 to CT3 may switch between the first voltage level and the second voltage level. The first voltage level may be, for example, a logic high level. The second voltage level may be, for example, a logic low level. In this embodiment, each of the emitting signals Tx1 to Txn (i.e., the first driving signals S11 to Sin) may be switched between the third voltage level and the fourth voltage level. The third voltage level may be, for example, a constant voltage value in the range of 25 volts (V) to 30 volts (V). The fourth voltage level may be, for example, 0V.

In each of the frame periods F1 to F3, the plurality of control signals CT1 to CT3 are respectively enabled in the corresponding first set time intervals F11 to F13, so that the plurality of light-emitting diodes 321 to 323 respectively receive the corresponding first sub-driving signals VSS1 to VSS3. In this way, in each of the frame periods F1 to F3, the second driving signal S2 (i.e., the first sub-driving signal VSS1, VSS2 or VSS3) is the set voltage in the corresponding first set time interval F11, F12 or F13. The plurality of first set time intervals F11 to F13 are the same fixed period. The set voltage may be, for example, a ground signal, or a constant voltage signal with a voltage level less than 0V.

In addition, in each of the frame periods F1 to F3, the emitting signal Tx1 (i.e., the first driving signal S11) transmitted by the first touch electrode 311_1 is a pulse signal. In each of the frame periods F1 to F3, the second touch electrode 312_1 generates the sensing signal Rx1 according to the plurality of first touch electrodes 311_1 to 311_*n*.

In this embodiment, the enabled period of the pulse signal (i.e., the first driving signal S11) is associated with the operation period TP1 of the corresponding first touch electrode 311_1 and the grayscale data of the corresponding first light-emitting element set 320*a*.

Specifically, in the frame period F1, the control signal CT1 is enabled in the corresponding first set time interval F11 to turn on the switch SW1, thereby causing the second end (i.e., cathode end) of the light-emitting diode 321 to be grounded within this interval F11. In the meantime, other control signals CT2 to CT3 are disabled to turn off the plurality of switches SW2 to SW3 respectively, thereby causing the second ends (i.e., cathode end) of the light-emitting diodes 322 to 323 to float.

In the frame period F1, the enabled period of the pulse signal (i.e., the first driving signal S11) may include a continuous operation period TP1 and a partial interval R1. During operation, TP1 is related to the wiring and computing capabilities of the touch circuit 310. The operation period TP1 may be, for example, the minimum conduction period (for example, 3 microseconds (μs)) during which the first touch electrode 311_1 may at least implement the touch function. The partial interval R1 may be, for example, a conduction period (i.e., a light-emitting period) of the light-emitting diode 321. In addition, the first set time interval F11 may be, for example, an interval of the frame period F1 excluding the operation period TP1 and overlapped with the partial interval R1.

In this embodiment, since the second end (that is, the cathode end) of the light-emitting diode 321 is grounded in the first set time interval F11, the light-emitting diode 321 may receive the third voltage level (i.e., the enabled first driving signal S11) and is turned on through the first end (i.e., the anode end) in the partial interval R1. In this way, the light-emitting diode 321 emits red light with a grayscale value of 255 (i.e., L255) according to the partial interval R1.

Next, in the frame period F2, the control signal CT2 is enabled within the corresponding first set time interval F12 to turn on the switch SW2, thereby causing the second end (i.e., cathode end) of the light-emitting diode 322 to be grounded in this interval F12. In the meantime, other control signals CT1 and CT3 are disabled to turn off a plurality of switches SW1 and SW3 respectively, thereby causing the second ends (i.e., cathode end) of the light-emitting diodes 321 and 323 to float.

Compared with the frame period F1, the enabled period of the pulse signal (i.e., the first driving signal S11) in the frame period F2 may include a continuous operation period TP1 and a partial interval G1. The partial interval G1 may be, for example, the light-emission period of the light-emitting diode 322. The first set time interval F12 may, for example, be an interval of the frame period F2 excluding the operation period TP1 and overlapped with the partial interval G1. In this way, the light-emitting diode 322 emits green light with a grayscale value of 0 (i.e., L0) according to the partial interval G1.

Next, in the frame period F3, the control signal CT3 is enabled within the corresponding first set time interval F13 to turn on the switch SW3, thereby causing the second end (i.e., cathode end) of the light-emitting diode 323 to be grounded in this interval F13. In the meantime, other control signals CT1 to CT2 are disabled to turn off a plurality of switches SW1 to SW2 respectively, thereby causing the second ends (i.e., cathode end) of the light-emitting diodes 321 to 322 to float.

Compared with the frame period F1, the enabled period of the pulse signal (i.e., the first driving signal S11) in the frame period F3 may include a continuous operation period TP1 and a partial interval B1. The partial interval B1 may be, for example, the light-emission period of the light-emitting diode 323. The first set time interval F13 may, for example, be an interval of the frame period F3 excluding the operation period TP1 and overlapped with the partial interval B1. In this way, the light-emitting diode 323 emits blue light with a grayscale value of 255 (i.e., L255) according to the partial interval B1.

It should be noted that since the widths of different partial intervals R1, G1, and B1 respectively affect the brightness of the plurality of light-emitting diodes 321 to 323, the touch display circuit 300 may adjust the widths of the partial intervals R1, G1, and B1 to control the proportions of red light, green light, and blue light respectively. In this way, the touch display circuit 300 may control the brightness (for example, purple) of the first light-emitting element set 320a according to the respective enabled periods (i.e., a plurality of partial intervals R1, G1, B1) of the first driving signal S11 in the plurality of consecutive frame periods F1 to F3

In this embodiment, for description of the operations of the other first driving signals S12 to Sin and the corresponding first light-emitting element sets 320b to 320n, please refer to related description of the operation of the first driving signal S11 and the corresponding first light-emitting element set 320a by analogy.

In some embodiments, the plurality of first ends of the plurality of light-emitting diodes 321 to 323 may be, for example, cathode ends, and the plurality of second ends of the plurality of light-emitting diodes 321 to 323 may be, for example, anode ends. The signals in some embodiments are inverse to the corresponding signals in this embodiment.

Figure 5:
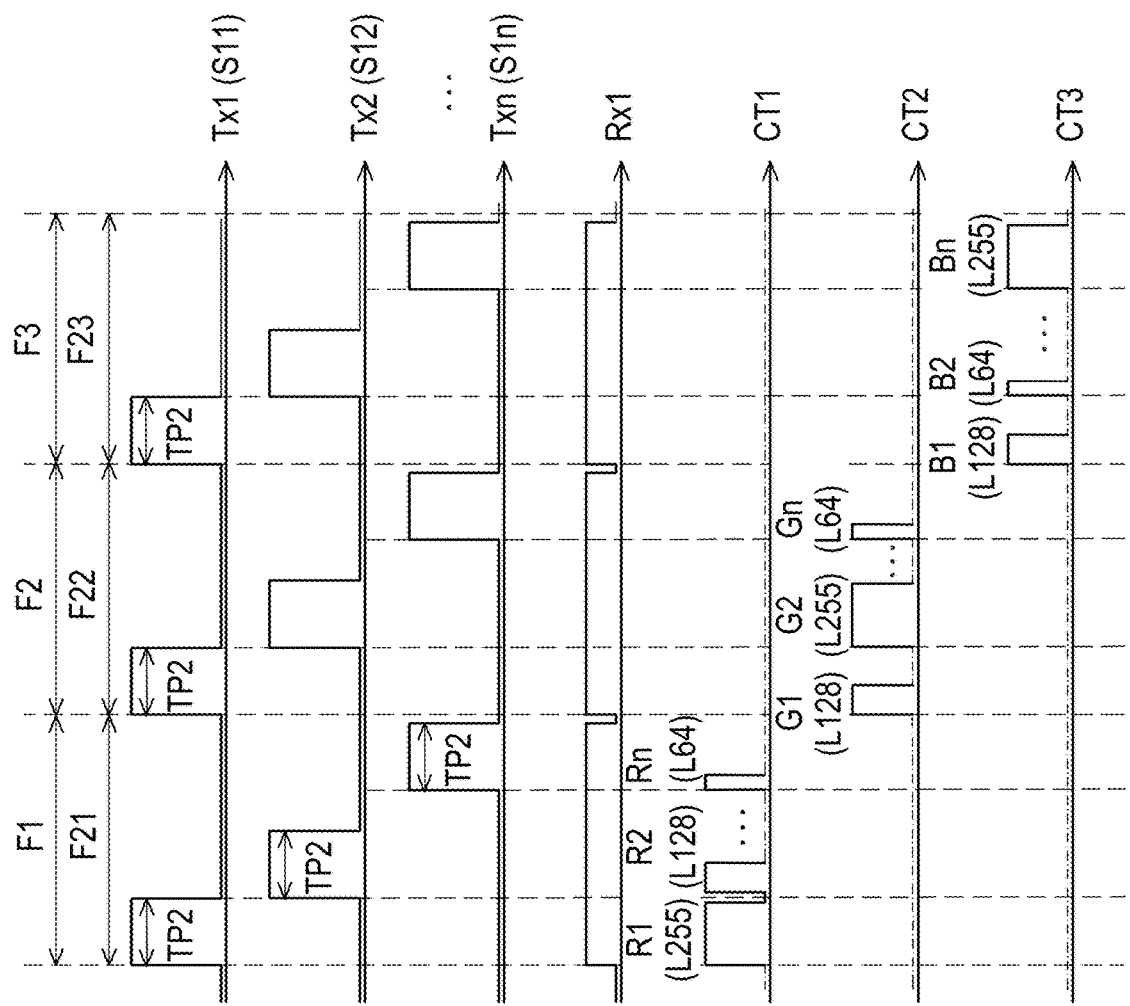
FIG. 5 is another schematic diagram of an operation of the touch display circuit shown in the embodiment of FIG. 3 according to the present disclosure.

Referring to FIG. 3 and FIG. 5, FIG. 5 is another schematic diagram of an operation of the touch display circuit shown in the embodiment of FIG. 3 according to the present disclosure. In FIG. 5, the horizontal axis represents the operation time of the touch display circuit 300 and the vertical axis represents the voltage value.

In the embodiment of FIG. 5, the brightness of each of the first light-emitting element sets 320a to 320n is controlled by the respective enabled periods of the plurality of control signals CT1 to CT3 in the plurality of consecutive frame periods F1 to F3. That is to say, the brightness of each of the first light-emitting element sets 320a to 320n is controlled by the conduction period of the second driving signal S2 (i.e., the plurality of first sub-driving signals VSS1 to VSS3) in the frame periods F1 to F3.

Specifically, in each of the frame periods F1 to F3, the emitting signal Tx1 (i.e., the first driving signal S11) is a pulse signal in each of the second set time intervals F21 to F23. The plurality of second set time intervals F21 to F23 are respectively less than or equal to the time lengths of the plurality of frame periods F1 to F3, and may be, for example, the same fixed interval. The enabled period TP2 of the pulse signal (i.e., the first driving signal S11) is the conduction period for the first touch electrode 311_1 to implement the touch function. In each of the frame periods F1 to F3, the second touch electrode 312_1 generates the sensing signal Rx1 according to the plurality of first touch electrodes 311_1 to 311_n.

In addition, in each of the frame periods F1 to F3, each of the control signals CT1 to CT3 is enabled at least once (for example, multiple times) in the corresponding second set time intervals F21 to F23, so that the plurality of light-emitting diodes 321 to 323 receive the plurality of first sub-driving signals VSS1 to VSS3 at least once (for example, multiple times). In this way, in each of the frame periods F1 to F3, the second driving signal S2 (i.e., the first sub-driving signals VSS1, VSS2 or VSS3) is the set voltage in at least one partial interval in each of the second set time intervals F21 to F23. The set voltage may be, for example, a ground signal, or a constant voltage signal with a voltage level less than 0V.

In this embodiment, since the plurality of control signals CT1 to CT3 respectively control the on and off of the plurality of switches SW1 to SW3, the enabled periods of the control signals CT1 to CT3 are the same as the period during which the plurality of first sub-driving signals VSS1 to VSS3 are conducted to the plurality of first light-emitting element sets 320a to 320n. That is to say, a partial interval of the second driving signal S2 (i.e., the first sub-driving signal VSS1, VSS2 or VSS3) is associated with the grayscale data of the first light-emitting element set 320a.

Specifically, in the frame period F1, the plurality of first driving signals S11 to Sin are sequentially enabled in the second set time interval F21 to form a plurality of pulse signals. The pulse signals do not overlap with each other, and each has a width of the period TP2. In the meantime, a plurality of first ends (i.e., anode ends) of a plurality of red LEDs (e.g., light-emitting diodes 321) in the plurality of first light-emitting element sets 320a to 320n sequentially and respectively receive the third voltage level (i.e., the plurality of enabled first driving signals S11 to Sin) within the corresponding period TP2.

In the frame period F1, the enabled period of the control signal CT1 may include a plurality of discontinuous partial intervals R1 to Rn in the corresponding second set time interval F21. The partial intervals R1 to Rn respectively overlap with corresponding plurality of periods TP2. The partial interval R1 may be, for example, the conduction period of the light-emitting diode 321. Other plurality of partial intervals R2 to Rn may be, for example, the conduction periods of the plurality of red LEDs in the plurality of first light-emitting element sets 320b to 320n. In the meantime, other plurality of control signals CT2 to CT3 are disabled to turn off the plurality of switches SW2 to SW3 respectively, thereby causing the second ends (i.e., cathode end) of the light-emitting diodes 322 to 323 to float.

In this embodiment, since the first ends (i.e., anode end) of the plurality of red LEDs in the plurality of first light-emitting element sets 320a to 320n sequentially receive the third voltage level during the corresponding period TP2, the red LEDs may be sequentially turned on in the plurality of partial intervals R1 to Rn by grounding the second end (i.e., the cathode end).

For example, in the frame period F1, the first end (i.e., anode end) of the light-emitting diode 321 receives the third voltage level in the corresponding period TP2, and the second end (i.e., the cathode end) of the light-emitting diode 321 is grounded in the partial interval R1. In this way, the light-emitting diode 321 emits red light with a grayscale value of 255 (i.e., L255) according to the partial interval R1. Next, in the frame period F1, the red LED in the first light-emitting element set 320*b* receives the third voltage level in the corresponding period TP2, and is grounded in the partial interval R2. In this way, the aforementioned red LED emits red light with a grayscale value of 128 (i.e., L128) according to the partial interval R2, and so on.

Next, in the frame period F2, a plurality of first driving signals S11 to Sin are sequentially enabled in the second set time interval F22 to form a plurality of pulse signals. The pulse signals may be inferred by analogy by referring to the pulse signals in the frame period F1. In the meantime, the first ends (that is, the anode end) of the plurality of green LEDs (for example, light-emitting diodes 322) in the plurality of first light-emitting element sets 320*a* to 320*n* sequentially and respectively receive the third voltage levels (i.e., a plurality of enabled first driving signals S11 to Sin) in the corresponding period TP2.

In the frame period F2, the enabled period of the control signal CT1 may include a plurality of discontinuous partial intervals G1 to Gn in the corresponding second set time interval F22. The partial intervals G1 to Gn respectively overlap with corresponding plurality of periods TP2. The partial interval G1 may be, for example, the conduction period of the light-emitting diode 322. Other plurality of partial intervals G2 to Gn may be, for example, the conduction periods of the plurality of green LEDs in the plurality of first light-emitting element sets 320*b* to 320*n* respectively. In the meantime, other plurality of control signals CT1 and CT3 are disabled to turn off the plurality of switches SW1 and SW3 respectively, thereby causing the second ends (i.e., cathode end) of the light-emitting diodes 321 and 323 to float.

Further to the above description, the plurality of green LEDs in the plurality of first light-emitting element sets 320*a* to 320*n* sequentially emit green light with corresponding grayscale values according to the plurality of partial intervals G1 to Gn in the corresponding period TP2. For example, in the frame period F2, the light-emitting diode 322 emits green light with a grayscale value of 128 (i.e., L128) according to the partial interval G1.

Next, in the frame period F3, a plurality of first driving signals S11 to Sin are sequentially enabled in the second set time interval F23 to form a plurality of pulse signals. The pulse signals may be inferred by analogy by referring to the pulse signals in the frame period F1. In the meantime, the first ends (i.e., the anode end) of the plurality of blue LEDs (for example, the light-emitting diodes 323) in the plurality of first light-emitting element sets 320*a* to 320*n* sequentially and respectively receive the third voltage level (i.e., the plurality of enabled first driving signals S11 to Sin) in the corresponding period TP2.

In the frame period F3, the enabled period of the control signal CT1 may include a plurality of discontinuous partial intervals B1 to Bn in the corresponding second set time interval F23. The partial intervals B1 to Bn respectively overlap with corresponding plurality of periods TP2. The partial interval B1 may be, for example, the conduction period of the light-emitting diode 323. Other plurality of partial intervals B2 to Bn may be, for example, the conduction periods of the plurality of blue LEDs in the plurality of first light-emitting element sets 320*b* to 320*n* respectively. In the meantime, other plurality of control signals CT1 to CT2 are disabled to turn off the plurality of switches SW1 to SW2 respectively, thereby causing the second ends (i.e., cathode end) of the light-emitting diodes 321 to 322 to float.

Further to the above description, the plurality of blue LEDs in the plurality of first light-emitting element sets 320*a* to 320*n* sequentially emit blue light with corresponding grayscale values according to the plurality of partial intervals B1 to Bn in the corresponding period TP2. For example, in the frame period F3, the light-emitting diode 323 emits blue light with a grayscale value of 128 (i.e., L128) according to the partial interval B1.

It should be noted that since LEDs of different colors are turned on sequentially in the plurality of consecutive frame periods F1 to F3, based on the color sequential method, the touch display circuit 300 may control the proportions of red light, green light, and blue light respectively by adjusting the widths of different partial intervals R1, G1, and B1. In this way, the touch display circuit 300 may control the brightness (for example, light red) of the first light-emitting element set 320*a* in the turned-on periods (i.e., the plurality of partial periods R1, G1, B1) of the plurality of first sub-driving signals VSS1 to VSS3 in the consecutive plurality of frame periods F1 to F3.

Figure 6:
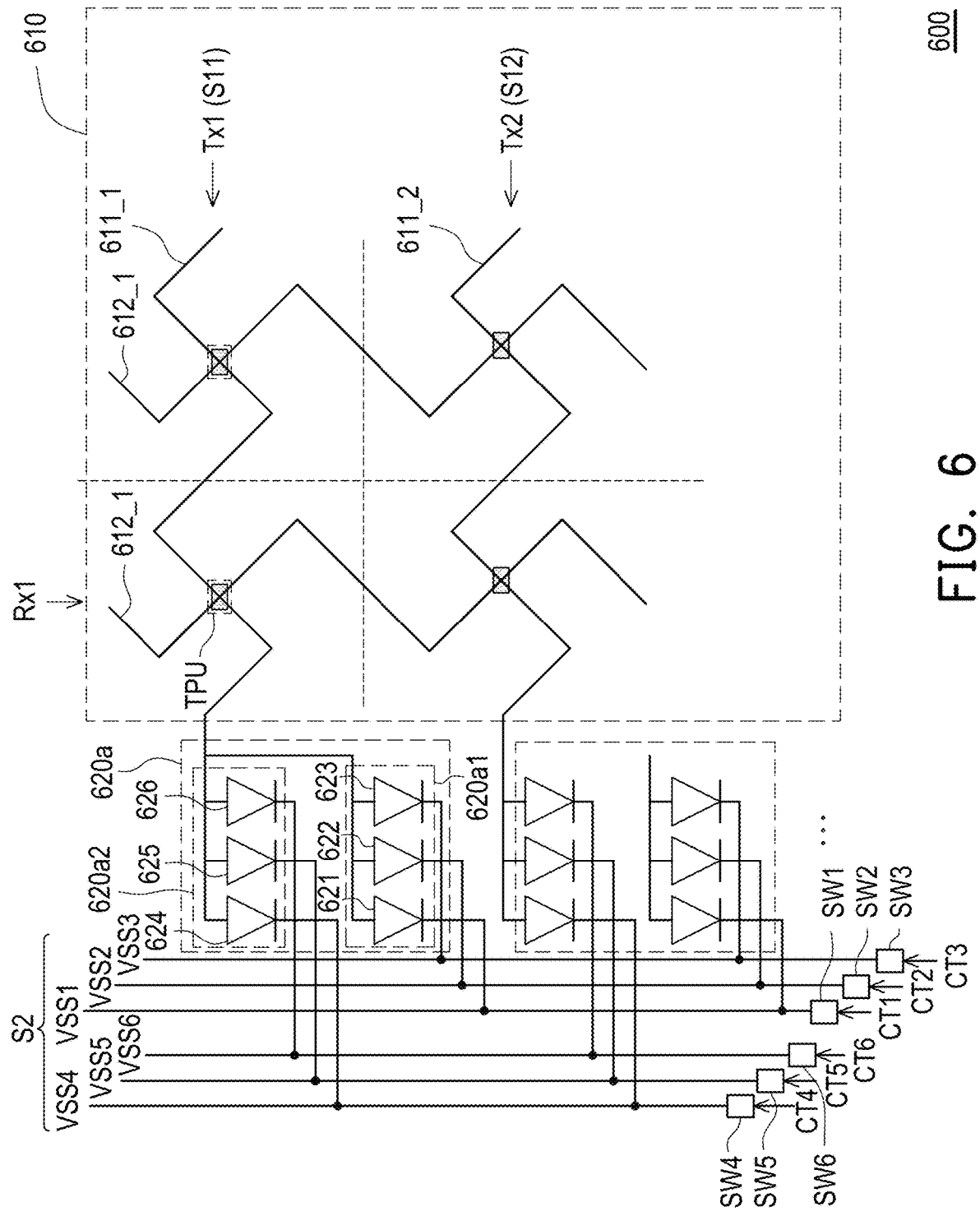
FIG. 6 is a circuit diagram of a touch display circuit according to another embodiment of the present disclosure.

FIG. 6 is a circuit diagram of a touch display circuit according to another embodiment of the present disclosure. Referring to FIG. 6, the touch display circuit 600 may include a touch circuit 610 and a first light-emitting element set 620*a*1. The first light-emitting element set 620*a*1 may include a plurality of light-emitting diodes 621 to 623. The touch circuit 610 may include a plurality of first touch electrodes 611_1 to 611_2 and a plurality of second touch electrodes 612_1 to 612_2. The respective numbers of the first light-emitting element set 620*al* and the touch electrodes 611_1 to 611_2 and 612_1 to 612_2 are only examples. The touch circuit 610 and the first light-emitting element set 620*al* may be inferred by analogy by referring to the description of the touch display circuit 300.

Compared with the embodiment of FIG. 3, in the embodiment of FIG. 6, the touch display circuit 600 may further include a second light-emitting element set 620*a*2. The second light-emitting element set 620*a*2 may include a plurality of light-emitting diodes 624 to 626. The plurality of light-emitting diodes 624 to 626 may be, for example, red LEDs, green LEDs, and blue LEDs respectively. A plurality of first ends (for example, a plurality of anode ends) of the plurality of light-emitting diodes 624 to 626 are directly coupled to the corresponding first touch electrode 611_1, and together with the plurality of light-emitting diodes 621 to 623, receive the common emitting signal Tx1 (i.e., the first driving signal S11). The plurality of second ends (for example, a plurality of cathode ends) of the plurality of light-emitting diodes 624 to 626 respectively receive a plurality of second sub-driving signals VSS4 to VSS6.

In this embodiment, a plurality of second sub-driving signals VSS4 to VSS6 may be included in the second driving signal S2 as another implementation of the second driving signal S2 in FIG. 1 or FIG. 3. The plurality of second sub-driving signals VSS4 to VSS6 may respectively be, for example, ground signals, or constant voltage signals with a voltage level less than 0V. The operations of the plurality of second sub-driving signals VSS4 to VSS6 may be the same as the operations of the first sub-driving signals VSS1 to VSS3 respectively.

In the embodiment of FIG. 6, the touch display circuit 600 may further include a plurality of switches SW4 to SW6. The plurality of switches SW4 to SW6 are respectively coupled between the plurality of second ends (i.e., cathode end) of the plurality of light-emitting diodes 624 to 626 and the plurality of second sub-driving signals VSS4 to VSS6. The plurality of switches SW4 to SW6 are respectively controlled by a plurality of control signals CT4 to CT6. For description of the plurality of switches SW4 to SW6, please refer to the relevant description of the switch SW1 in FIG. 3 by analogy.

It should be noted that since the first light-emitting element set 620*al* and the second light-emitting element set 620*a*2 receive a common emitting signal Tx1 (i.e., the first driving signal S11), the light-emitting element sets 620*a*1 to 620*a*2 emit light according to the same timing. That is to say, on the wiring connected to the first touch electrode 611_1, the first light-emitting element set 620*al* and the second light-emitting element set 620*a*2 may be regarded as the same light-emitting element set 620*a*. In this way, compared with the embodiment of FIG. 3, through the operation of the plurality of light-emitting element sets 620*al* to 620*a*2, the touch display circuit 600 may increase the resolution (for example, by 2 times).

In some embodiments, the respective numbers of the second light-emitting element set 620*a*2 and the corresponding plurality of second sub-driving signals VSS4 to VSS6 may be greater than 2 sets. In this way, the touch display circuit 600 may adjust (for example, increase) the resolution according to the aforementioned quantity.

In summary, the touch display circuit and touch display device according to the embodiments of the present disclosure may be applied in OGM and OGS architectures. Through a single wiring connected to the first touch electrode, the touch display circuit may integrate the first light-emitting element set according to the resolution. In addition, the touch display circuit may simultaneously drive the touch circuit and the first light-emitting element set through the same emitting signal (i.e., the first driving signal), thereby simplifying the circuit design. In some embodiments, the touch display circuit may control the brightness of the first light-emitting element set by controlling the enabled period of the emitting signal, or by controlling the turned-on period of the plurality of first sub-driving signals.

Although the present disclosure has been disclosed above through embodiments, it is not intended to limit the present disclosure. Anyone with ordinary knowledge in the technical field can make some modifications and refinement without departing from the spirit and scope of the present disclosure. Therefore, the scope to be protected by the present disclosure shall be determined by the appended claims.

What is claimed is:

1. A touch display circuit, comprising:
a touch circuit comprising a first touch electrode and corresponding plurality of second touch electrodes, wherein the first touch electrode receives an emitting signal, the plurality of second touch electrodes respectively generate a plurality of sensing signals; and
a first light-emitting element set having a first end directly coupled to the first touch electrode and receiving the emitting signal as a first driving signal, wherein a second end of the first light-emitting element set receives at least one second driving signal,
wherein the first light-emitting element set comprises a plurality of light-emitting diodes, and the plurality of light-emitting diodes are configured to emit light of different wavelengths, wherein the at least one second driving signal comprises a plurality of first sub-driving signals, wherein a plurality of first ends of the plurality of light-emitting diodes are directly coupled to the first touch electrode, and a plurality of second ends of the plurality of light-emitting diodes receive the plurality of first sub-driving signals respectively,
wherein the touch display circuit further comprises a plurality of switches respectively coupled between the plurality of second ends of the plurality of light-emitting diodes and the plurality of first sub-driving signals to be controlled by a plurality of control signals.

2. The touch display circuit according to claim 1, wherein in each of a plurality of frame periods, the at least one second driving signal is a set voltage in a first set time interval, and the first driving signal is a pulse signal.

3. The touch display circuit according to claim 2, wherein an enabled period of the pulse signal is related to an operation period of the first touch electrode and a grayscale data of the first light-emitting element set.

4. The touch display circuit according to claim 1, wherein in each of a plurality of frame periods, the first driving signal is a pulse signal in a second set time interval, and the at least one second driving signal is a set voltage in at least one partial interval in the second set time interval.

5. The touch display circuit according to claim 4, wherein the at least one partial interval is associated with a grayscale data of the first light-emitting element set.

6. The touch display circuit according to claim 1, wherein the at least one second driving signal further comprises a plurality of second sub-driving signals, wherein the touch display circuit further comprises:
a second light-emitting element set having a plurality of first ends directly coupled to the first touch electrode and receiving the first driving signal, wherein a plurality of second ends of the second light-emitting element set receive the plurality of second sub-driving signals respectively.

7. A touch display device, comprising:
a display panel having a pixel array; and
the touch display circuit according to claim 1, coupled to the pixel array.

8. The touch display device according to claim 7, wherein the first light-emitting element set is disposed on at least one lateral side of the display panel.

9. The touch display device according to claim 7, wherein the display panel comprises a plurality of sub-display panels spliced to each other, wherein the first light-emitting element set is disposed between the plurality of sub-display panels.

* * * * *